united States Patent Office 3,725,129
Patented Apr. 3, 1973

3,725,129
METHOD FOR PREPARING PASTED NICKEL
HYDROXIDE ELECTRODE
Joseph G. Ruzzo, Jr., Schenectady, N.Y., assignor to the
United States of America as represented by the Secretary of the Air Force
Filed Feb. 14, 1972, Ser. No. 226,023
Int. Cl. H01m 43/04
U.S. Cl. 136—29                    6 Claims

ABSTRACT OF THE DISCLOSURE

A method for preparing nickel hydroxide ($NiOH_2$) electrodes is provided by applying to a metallic substrate a layer of an aqueous paste of nickel hydroxide, nickel powder and a binder; compressing the substrate with its applied layer of paste to remove excess water; drying the paste; and compressing the substrate and dried paste at a pressure sufficient to achieve intimate nickel hydroxide-nickel metal interfacial contact. The electrodes so prepared are particularly useful for electrical storage batteries although they can be employed in electrolytic cells generally.

FIELD OF THE INVENTION

This invention relates to a method of preparing pasted nickel hydroxide electrodes. In one aspect it relates to a pasted nickel hydroxide electrode that has a high energy density.

BACKGROUND OF THE INVENTION

Nickel hydroxide electrodes in general use at the present time consist of a sintered nickel substrate which is chemically or electrochemically impregnated with active material. The procedure followed in preparing such electrodes is time consuming in that a number of operations is involved, thereby resulting in high production costs. Furthermore, because of the complicated procedure involved in fabricating such electrodes, uniformity of product is difficult to attain. Electrodes having a pasted structure have been prepared in the past, but they have not proven to be entirely satisfactory. While it is known that an electrode prepared by a pasting technique can be made to have a potentially higher capacity, it has not been possible to utilize this capacity. Thus, it has been found that pasted $Ni(OH)_2$ electrodes manufactured by methods described in the prior art can be readily charged

[$Ni(OH)_2 \rightarrow NiOOH + 1e^- + 1H^+$]

but they are not easily discharged

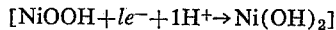
[$NiOOH + 1e^- + 1H^+ \rightarrow Ni(OH)_2$]

It is an object of this invention, therefore, to provide a pasted $Ni(OH)_2$ electrode that can be charged and easily discharged.

Another object of the invention is to provide a method of preparing a pasted nickel hydroxide electrode.

A further object of the invention is to provide a pasted nickel hydroxide electrode that has a high energy density.

Other objects and advantages of the invention will become apparent to those skilled in the art upon consideration of the accompanying disclosure and the drawing in which:

FIG. 3 is a graph showing electrode energy density vs. cycle number.

SUMMARY OF THE INVENTION

Figure 1:
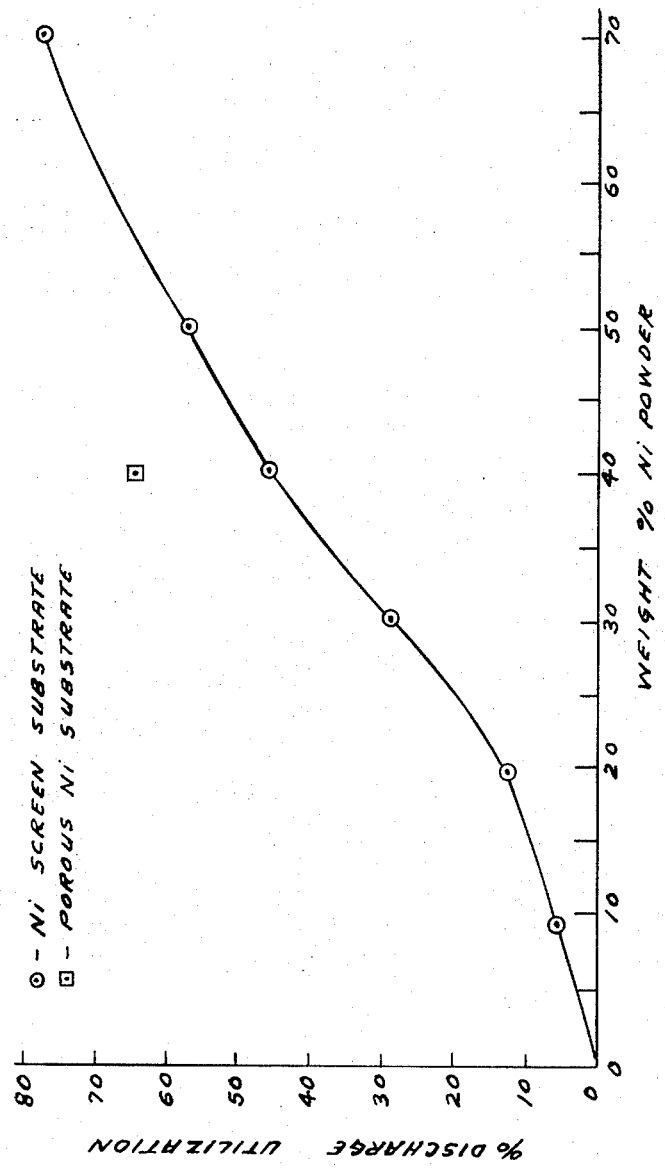
FIG. 1 is a graph showing electrode discharge utilization vs. weight percent nickel powder.

Broadly speaking, the present invention resides in a method of preparing pasted electrodes which comprises the steps of applying to a foraminous metal substrate a layer of an aqueous paste consisting essentially of nickel hydroxide, nickel powder and a binder; compressing the substrate with its layer of paste to remove excess water; heating the substrate at a temperature and for a period of time sufficient to dry the paste; and compressing the substrate with its dried layer of paste at a pressure sufficient to cause nickel hydroxide-nickel metal interfacial contact.

In one embodiment, the invention resides in a pasted electrode consisting essentially of a foraminous nickel substrate having bonded thereto a dried paste consisting essentially of nickel, hydroxide, nickel powder and a thermoplastic binder, the electrode having a porosity in the range of about 30 to 50 percent, preferably from about 30 to 40 percent. The term "porosity" as used herein is used to refer to the percentage obtained by dividing the void volume of the electrode by the total electrode volume.

It has been discovered that the pasted nickel hydroxide electrode of this invention having the indicated porosity has a high energy density. Furthermore, the electrode can be readily charged and easily discharged, a distinct advantage over the prior art pasted electrodes. The porosity of the electrode is an important and critical factor or property in achieving a pasted electrode that may be utilized in place of the conventional sintered electrode. In the fabrication of a particular pasted electrode, there is a direct relationship between porosity and the pressure employed in the final compressing step of the method of this invention. Furthermore, at the pressures used to obtain the required porosity, the interfacial contact between the nickel hydroxide and nickel powder is maximized. This results in the enhancement of conductivity within the electrode, a factor that advantageously affects the electrode's performance. Thus, porosity, pressure used in compressing step, and contact between conducting additive (nickel powder) and active material [$Ni(OH)_2$] are interrelated. For example, in preparing a particular pasted electrode, a certain pressure is required to obtain a desired porosity at which there is maximum contact between conducting additive and active material. However, as discussed hereinafter, there are other facets of the present invention that are important in preparing the pasted nickel hydroxide electrode.

A foraminous metal serves as the substrate to which the aqueous paste is applied. The term "foraminous metal" is used to designate a metallic material having openings or pores therein to which the paste can be applied by any suitable means in a manner such as to fill the openings or pores and cover the substrate. While metals such as titanium, tantalum, platinum or stainless steel can be employed, nickel has been found to be the preferred metal from which to fabricate the substrate. A substrate in the form of a screen is useful in preparing the pasted electrode. A 7-mil, 20-mesh nickel screen provides a particularly suitable substrate although other size screens can be used, e.g., 5 to 10 mil, 15 to 30 mesh screens. While nickel screening is a preferred substrate, one formed from porous nickel is even more desirable because of the unexpected and outstanding results obtained with pasted electrodes utilizing this material as a substrate. The porous nickel resembles a sponge with the major portion, e.g., from about 85 to 98 percent, of the material being voids. Or to describe the material in another manner, it is from about 85 to 98 percent porous. The thickness of the porous nickel is considerably greater than the gauge of the nickel wire of the screening. For example, its thickness can range from about 75 to 150 mils. An especially preferred nickel substrate is 97 percent porous and has a thickness of 100 mils.

The active material, nickel hydroxide, is in finely divided form, generally having a diameter less than 125 microns, e.g., a diameter in the range of about 50 to 125 microns. It is within the purview of the invention for the active material to contain a minor amount, e.g., from about 1 to 15 mol percent, of cobolt hydroxide. The conductive material, nickel metal, is in the form of a very finely divided powder. Generally the size of the nickel powder ranges from about 2 to 5 microns.

The binder used in preparing the electrode is a thermoplastic polymeric material that is soluble in water and insoluble in potassium hydroxide. A variety of polymers can be utilized, such as polyvinyl acetate, polyvinyl alcohol and the like. However, it is preferred to employ polyvinylpyrrolodone which, because of its superior binding properties, makes it possible to use small amounts of the binder in fabricating the electrode. Since small amounts of this binder can be employed, it is possible to include in the paste formulations large amounts of active and conductive materials.

The amounts of the materials used in forming the paste formulation can vary within rather wide ranges although it is critical that the formulation contain at least 30 weight percent nickel powder. Thus, the formulation can contain a mixture of about 25 to 69 weight percent of active material, i.e., nickel hydroxide or a mixture thereof with cobalt hydroxide as indicated above; about 30 to 70 weight percent of nickel powder; and about 1 to 5 weight percent of binder, based upon a total of 100 weight percent. Preferably, the formulation contains 27 to 59 weight percent active material, 40 to 70 weight percent nickel powder and 1 to 3 weight percent binder.

In fabricating a pasted electrode, the binder, the nickel powder and the nickel hydroxide are thoroughly mixed in the dry state. A preferred method for mixing the ingredients is to disperse the binder and nickel powder in the nickel hydroxide by means of a ball mill. Water is then added to the mixture in an amount sufficient to provide a viscous mass. The actual amount added will vary with the amounts of the ingredients in the mixture and is in no manner critical so long as a mass of paste-like quality is obtained that can be readily applied to the nickel substrate. While any suitable means can be used in applying the paste, a brush or spatula can be conveniently employed. In general, the amount of water added should be such that the paste has a consistency such that it can be readily applied with a brush or spatula. In a preferred procedure, the dry mixture is spread on the nickel substrate which is resting on a separator material such as nonwoven nylon. Water is then added to the dry mixture and then mixed to form a paste which is spread into the substrate. Water can be added as required so as to maintain the paste at a workable consistency. The wet-pasted electrode is prepressed between stainless steel plates in order to remove any excess water from the matrix. The pressure used is only that which is sufficient to squeeze out the water and is usually less than 1000 p.s.i., e.g., in the range of 100 to 1000 p.s.i.

After the prepressing step, the electrode is dried. This is conveniently accomplished by oven drying the electrode at a temperature in the range of about 150 to 160° F. for a period ranging from about 6 to 18 hours. The drying step must be carefully conducted in that severe dehydration may cause the dried paste or plate to crack and become separated from the substrate. However, in the event cracking should occur, water can be added so as to constitute the paste which is then prepressed, if required, and dried as in the original operation.

After the drying step, the pasted electrode is subjected to a second and final pressing step in which high pressures are utilized. While the pressure used in fabricating a particular electrode will depend upon the particular substrate employed as well as the composition of the paste mixture applied to the substrate, the pressure, in general, is that which will provide maximum interfacial contact between the nickel powder and nickel hydroxide. The pressure is usually in the range of about 7,000 to 25,000 p.s.i. When using nickel screen as the substrate, lower pressures are generally employed, e.g., ranging from about 7,000 to 10,000 p.s.i. Higher pressures ranging from about 15,000 to 25,000 p.s.i. are required with a porous nickel substrate. After the final pressing step the electrode has a porosity ranging from about 30 to 50, preferably from about 30 to 40, percent. The thickness of the electrode generally ranges from about 25 to 100, preferably 30 to 70 mils.

A better understanding of the invention can be obtained by referring to the following illustrative examples which are not intended, however, to be unduly limitative of the invention.

EXAMPLE I

A series of $Ni(OH)_2$ pasted electrodes was prepared, utilizing a mixture of 90 mol percent $Ni(OH)_2$ and 10 mol percent $Co(OH)_2$ as the active material, nickel powder as the conductive material and polyvinylpyrrolodone resin as the binder.

The active material was prepared by dissolving 327 grams of $Ni(NO_3)_2 \cdot 6H_2O$ and 36.4 grams of $$Co(NO_3)_2 \cdot 6H_2O$$

in distilled water. The amount of distilled water used was such as to provide 1 liter of solution. To 250 ml. of this solution, there was then added with rapid stirring 240 ml. of 22.5% KOH. The result was centrifuged, the supernatant was removed, and the precipitate formed was washed by stirring with distilled water. The latter sequence was repeated until the pH of the supernatant was about 8. The collected precipitate was dried at 150° F., pulverized in a mortar, sieved through a 125-micron screen and stored under vacuum. The composition of the stored active material was 90 mol percent $Ni(OH)_2$ and 10 mol percent $Co(OH)_2$.

The formulations used in preparing the electrodes are shown below in Table I.

TABLE I

| | Weight percent | | |
|---|---|---|---|
| Electrode Number | $Ni(OH)_2$—$Co(OH)_2$ [1] (90–10 mol percent) | Nickel powder [2] | Binder [3] |
| 1 | 68 | 30 | 2 |
| 2 | 58 | 40 | 2 |
| 3 | 48 | 50 | 2 |
| 4 | 28 | 70 | 2 |
| 5 | 58 | 40 | 2 |

[1] Active material.
[2] INCO 255 nickel powder-conductive material.
[3] Polyvinylpyrrolodone (GAF Ganex V816).

Pasted electrodes 1–4 were prepared on 7-mil, 20-mesh nickel screens (1.75 in. x 1.75 in.) having a geometric area of 3.06 in.[2] (19.7 cm.[2]) with a tab for electrical connections. Pasted electrode 5 was prepared on a 100 mil-thick, 97% porous nickel substrate (45 pores per linear inch) having the same geometric area as the nickel screen substrate. The electrodes were designed so as to correspond to the specific capacity of 3.75 ampere hours/dm.[2] (theroetical), i.e., 0.739 ampere-hour per electrode.

Carefully weighed dry mixes containing 2.56 gms. of active material and amounts of nickel powder and binder corresponding to the weight percentages shown in Table I were prepared by dispersing the binder and nickel powder in the active material by means of a ball mill. Each of the dry mixes were then spread on the nickel screens or the porous nickel substrate which were resting on a nonwoven nylon separator material. Water was then added and mixed with the dry mixes to form a paste and spread into the screen and porous nickel substrates. Thereafter, the wet-pasted electrodes were pressed between stainless steel plates, utilizing a pressure only high enough to squeeze excess water out of the matrix. The pasted electrodes, sandwiched between Lucite plates, were then placed in an oven and dried overnight at 150° F. The constraining Lucite plates were beneficial in maintaining the integrity of the plates (electrodes) during drying. Dried, pasted electrodes 1–4 were finally pressed between stainless steel plates at a pressure of about 8,000 p.s.i. Dried electrode 5 was also pressed between stainless steel plates, but a pressure of about 20,000 p.s.i. was used.

Cycling tests, in this and in subsequent examples were performed with flooded cells of 31% KOH at ambient temperature and in a $CO_2$-free environment. The sealed test cells, which were constructed of Lucite plastic, contained a Hg/HgO reference electrode. The electrode pack consisted of one positive test electrode, two commercial cadmium negative electrodes, and four layers of separator formed of non-woven nylon. One layer of the nylon was positioned between the positive test electrode and each of the negative electrodes, and one layer was placed on the outside of the pack. The negative plates had been decarbonated by charging and discharging them in excess 31% KOH, after which they were washed and dried. The separator material had been washed thoroughly in distilled water and dried before use.

All testing was conducted at the C/5 rate (.150 ampere), where C is equal to capacity in ampere-hours and 5 designates the number of hours. The cycles were determined by a voltage cutoff established by the oxygen evolutionary reaction during the charging process and selected as 0.10 volt versus Hg/HgO during discharge. The charging voltage cutoff was carefully selected to correspond to a stabilized condition of overcharge wherein any further oxidation of $Ni(OH)_2$ is insignificant.

The results obtained when electrodes 1–5 were cycled at the C/5 rate are shown below in Table II. The data in the table were obtained from the 10th cycle. Also shown in this table are the thickness and porosity of the test electrodes.

TABLE II

|  | Electrode Number [1] | | | | |
|---|---|---|---|---|---|
|  | 1 | 2 | 3 | 4 | 5 |
| Nickel powder, percent | 30 | 40 | 50 | 70 | 40 |
| Thickness, mils | 98 | 34 | 40 | 65 | 30 |
| Porosity, percent | 38 | 38 | 41 | 49 | 29 |
| Maximum discharge utilization,[2] percent | 29 | 43 | 58 | 77 | 62 |
| Energy density (ampere-hours/inch[3]) | 1.81 | 3.06 | 3.51 | 2.86 | 5.09 |

[1] Substrate for electrodes 1–4 was 20-mesh, 7-mil nickel screen; substrate for electrode 5 was 100-mil thick, 97% porous nickel.
[2] The ratio of discharged capacity divided by the theoretical capacity of the plate (0.739 ampere-hour). The discharged capacity is the deliverable capacity resulting after a full charge terminated by a voltage cutoff signal and indicating an inflection in the charge curve. All utilizations were measured on the tenth cycle of the plate.

EXAMPLE II

Pasted electrodes were also prepared, using a 20-mesh, 7-mil Ni screen substrate and containing the same amount of the active material as in Example I, 10 and 20 percent of the Ni powder and 2 percent of the binder. The same procedures described in Example I were followed in fabricating and testing the two electrodes. The results of the tests are shown below in Table III.

TABLE III

|  | Percent | | |
|---|---|---|---|
| Electrode Number | Nickel powder | Maximum discharge utilization [1] | Energy density[2] (ampere-hours/inch [3]) |
| 6 | 10 | 4 |  |
| 7 | 20 | 12 |  |

[1] See footnote (2) of Table II.
[2] Utilizations correspond to energy density less than about 0.75 ampere-hours/inch [3].

EXAMPLE III

A series of pasted electrodes having a porosity of 72 percent was prepared and tested. The procedure followed in preparing the electrodes was the same as that described in Example I, using Ni screen as the substrate, except that the final pressing step was omitted. The amount of active material used and the weight percent of binder were the same, but the weight percent of nickel powder was varied. An electrode was also prepared in which the dry mix was merely compressed at 8,000 p.s.i. The results of the tests, conducted as in Example I, are shown in Table IV.

TABLE IV

| Electrode Number | Nickel powder, wt. percent | Percent Porosity | Percent Utilization [a] | Energy density (ampere-hours/inch[2]) |
|---|---|---|---|---|
| 8 | 2 | 72 | 0 |  |
| 9 | 5 | 72 | 7 |  |
| 10 | 10 | 72 | 5 |  |
| 11 | 20 | 72 | 5 |  |
| 12 | 30 | 72 | 9 |  |
| 13 | 30 | 28 | 5 |  |

[a] See footnote (2) of Table II.
[b] Utilizations correspond to energy density in the range of 0.14 to 0.33 ampere-hour/inch [3].
[c] Electrode pressed from dry powder.

The data in Table II show that the $Ni(OH)_2$ pasted electrodes of this invention possessed high energy densities. A comparison between the data in Tables II and III indicates that at least 30 weight percent of nickel powder is required. Furthermore, the discharge utilizations increased with increasing amounts of nickel powder. However, the data also demonstrate that the highest energy density was obtained with a porous nickel substrate even though a smaller amount of nickel powder was used than was required to obtain the higher densities with a nickel screen substrate.

The data in Table IV show the criticality of employing the final pressing step in preparing the pasted electrodes of this invention. Moreover, the data in the table indicate that a satisfactory electrode cannot be prepared by merely compressing a mixture of the ingredients in the form of dry powder. The data in Tables II and IV can also be said to demonstrate the importance of obtaining good interfacial contact between the active material and the nickel powder.

Reference is now made to the drawing in which the results of the tests, which were conducted with the electrodes of this invention, are shown graphically. In FIG. 1 it is seen that the discharge utilization increased with increasing amounts of nickel powder when using a nickel screen. The data obtained in testing the electrodes of Example II have also been plotted in this figure to show graphically the criticality of using at least 30 weight percent nickel powder. Also as shown in the graph, based on the same amount of nickel powder (40%), the discharge utilization was much higher when using a porous nickel substrate.

Figure 2:
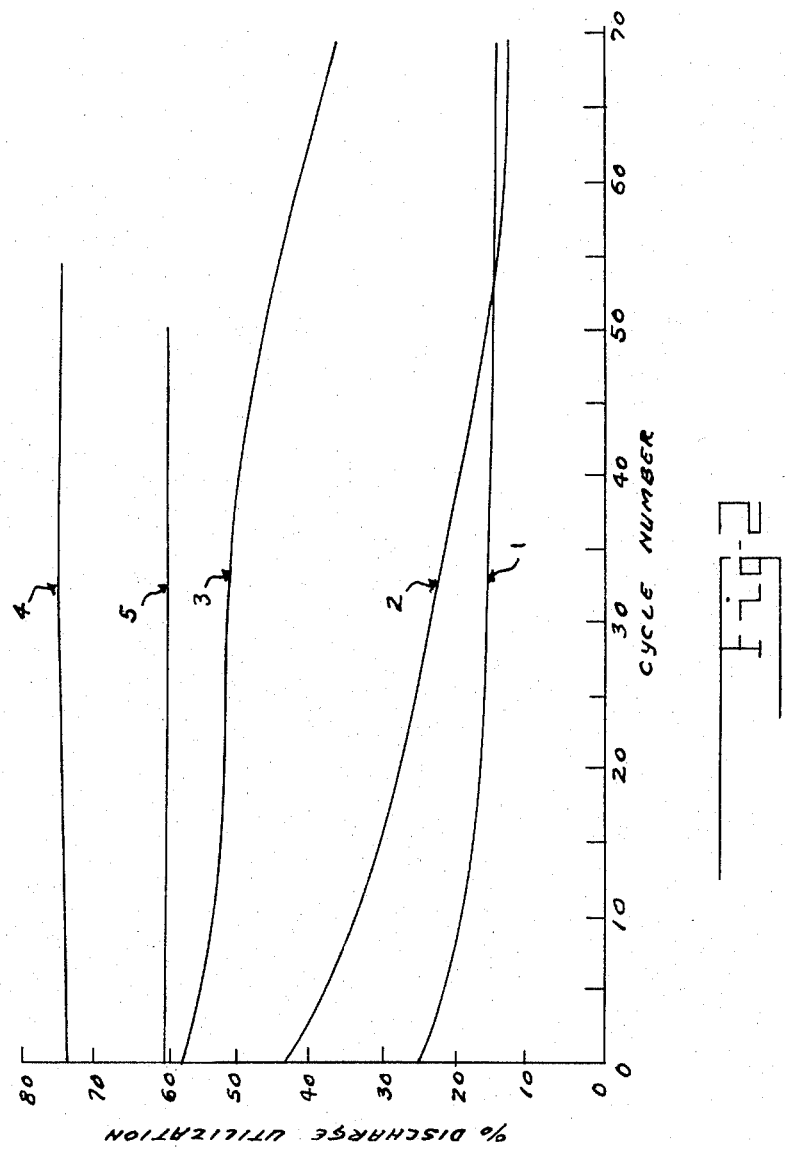
FIG. 2 is a graph showing electrode discharge utilization vs. cycle number.
Figure 2:
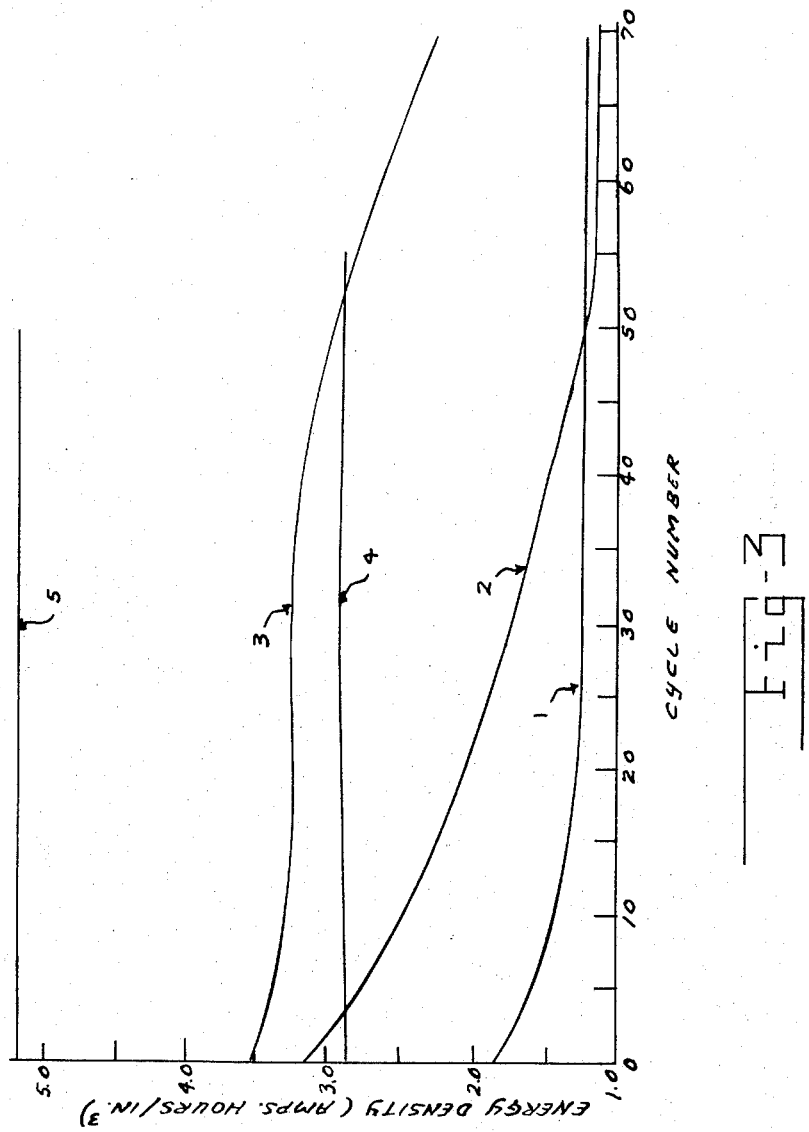

In FIG. 2 graphs of discharge utilization versus cycle number for the several electrodes fabricated and tested as described in Example I are depicted. The graphs have been numbered to correspond to the electrodes as designated in Tables I and II. FIG. 3 shows graphs of energy density versus cycle number for the same electrodes. The graphs show the pronounced effect that nickel powder content has on discharge utilization, energy density and capacity maintenance. In particular, the graphs show the superior overall performance obtained with electrode 5 that was fabricated with a porous nickel substrate.

As will be evident to those skilled in the art, various modifications of this invention can be made as followed in view of the foregoing disclosure without departing from the spirit or scope of the invention.

I claim:
1. A method of preparing pasted electrode which comprises the steps of:
   (1) applying to a foraminous nickel substrate a layer of an aqueous paste consisting essentially of about 25 to 69 weight percent nickel hydroxide, about 30 to 70 weight percent nickel powder and about 1 to 5 weight percent binder, based on a total of 100 weight percent;
   (2) compressing the substrate with its layer of paste to remove water;
   (3) heating the substrate and applied paste at a temperature and for a period of time sufficient to dry the paste; and
   (4) compressing the substrate with its dried layer of paste at a pressure sufficient to cause interfacial contact between the nickel hydroxide and nickel powder.
2. The method according to claim 1 in which the nickel paste consists essentially of 27 to 59 weight percent nickel hydroxide, 40 to 70 weight percent nickel powder and 1 to 3 weight percent binder.
3. The method according to claim 1 in which the substrate and applied paste were heated at a temperature in the range of about 150 to 160° F. for a period of about 6 to 18 hours, and the resulting substrate and dried paste are compressed at a pressure in the range of about 7,000 to 25,000 p.s.i.
4. The method according to claim 3 in which the substrate is a nickel screen; the aqueous paste consists essentially of 27 to 59 weight percent nickel hydroxide, 40 to 70 weight percent nickel powder and 1 to 3 weight percent polyvinylpyrrolodone; and the substrate and dried paste are compressed at a pressure in the range of about 7,000 to 10,000 p.s.i.
5. The method according to claim 3 in which the substrate is porous nickel having from about 85 to 98 percent voids; the aqueous paste consists essentially of 27 to 59 weight percent nickel hydroxide, 40 to 70 weight percent nickel powder and 1 to 3 weight percent polyvinylpyrrolodone; and the substrate and dried paste are compressed at a pressure in the range of about 15,000 to 25,000 p.s.i.
6. The method according to claim 5 in which the aqueous paste consists essentially of 27 to 59 weight percent of a mixture of nickel hydroxide and cobalt hydroxide, the amount of cobalt hydroxide being about 1 to 15 mol percent of the mixture, 40 to 70 weight percent nickel powder and 1 to 3 weight polyvinylpyrrolodone.

References Cited
UNITED STATES PATENTS

| | | | |
|---|---|---|---|
| 3,202,544 | 8/1965 | Vielstich | 136—6 |
| 3,214,297 | 10/1965 | Horn et al. | 136—29 |
| 3,457,113 | 7/1969 | Deibert | 136—86 D |
| 3,597,829 | 8/1971 | Wagner et al. | 29—420.5 |
| 3,640,772 | 2/1972 | Falk et al. | 136—67 |

ANTHONY SKAPARS, Primary Examiner